(12) United States Patent
Tracht

(10) Patent No.: US 7,195,274 B2
(45) Date of Patent: Mar. 27, 2007

(54) VEHICLE SEAT COMPONENT SIDE AIR BAG MODULE HAVING AIR BAG GUIDE INCLUDING FLEXIBLE INNER AND OUTER PANELS ATTACHED BY MODULE CONNECTOR AND FRAME CONNECTOR AND TRIM COVER ATTACHED BY FRAME CONNECTOR

(75) Inventor: Michael L. Tracht, Ingolstadt (DE)

(73) Assignee: Lear Corporation, Southfield, MI (US)

( * ) Notice: Subject to any disclaimer, the term of this patent is extended or adjusted under 35 U.S.C. 154(b) by 315 days.

(21) Appl. No.: 10/904,855

(22) Filed: Dec. 1, 2004

(65) Prior Publication Data
US 2006/0113770 A1   Jun. 1, 2006

(51) Int. Cl.
*B60R 21/20* (2006.01)

(52) U.S. Cl. .............................. 280/728.3; 280/730.1; 280/730.2

(58) Field of Classification Search ............. 280/728.1, 280/728.2, 730.1, 730.2, 730.3; 297/216.13, 297/216.12
See application file for complete search history.

(56) References Cited

U.S. PATENT DOCUMENTS

| 5,498,030 | A |   | 3/1996  | Hill et al.       |
|-----------|---|---|---------|-------------------|
| 5,678,853 | A |   | 10/1997 | Maly              |
| 5,749,597 | A |   | 5/1998  | Saderholm         |
| 5,762,363 | A |   | 6/1998  | Brown et al.      |
| 5,816,610 | A |   | 10/1998 | Higashiura et al. |
| 5,860,673 | A |   | 1/1999  | Hasegawa et al.   |
| 5,863,063 | A |   | 1/1999  | Harrell           |
| 5,893,579 | A | * | 4/1999  | Kimura et al. ............ 280/730.2 |
| 5,927,749 | A |   | 7/1999  | Homier et al.     |
| 5,938,232 | A |   | 8/1999  | Kalandek et al.   |
| 5,967,546 | A | * | 10/1999 | Homier et al. ............ 280/730.2 |
| 5,967,603 | A |   | 10/1999 | Genders et al.    |
| 5,975,567 | A | * | 11/1999 | Higashiura ............... 280/730.2 |
| 5,988,674 | A | * | 11/1999 | Kimura et al. ........... 280/730.2 |
| 6,045,151 | A |   | 4/2000  | Wu                |

(Continued)

FOREIGN PATENT DOCUMENTS

EP   0 856 439 A1   8/1998
EP   1 069 005 A3   1/2001

OTHER PUBLICATIONS

U.S. Appl. No. 08/808,572, filed Feb. 28, 1997, Wu et al.

*Primary Examiner*—David R. Dunn
*Assistant Examiner*—Toan C. To
(74) *Attorney, Agent, or Firm*—Brooks Kushman P.C.

(57) ABSTRACT

A vehicle seat component (18) includes a side air bag module (18) mounted on a frame (24) within a trim cover (34) that also covers a seat pad (30). An air bag guide (44) includes flexible inner and outer panels (46,48) that extend between a release seam (36) of the trim cover (34) and the air bag module (18) to provide a guiding function to an air bag (42) thereof as it is inflated upon deployment so as to project outwardly through the release seam (36) for use. Inner extremities (52, 56) of the flexible inner and outer panels (46, 48) of the air bag guide (44) are respectively secured by a first connector (64) that mounts the air bag module (18) and a second connector (82) to the frame, and the trim cover (34) is secured to the frame by a third connector (84).

13 Claims, 4 Drawing Sheets

U.S. PATENT DOCUMENTS

| | | |
|---|---|---|
| 6,237,934 B1 | 5/2001 | Harrell et al. |
| 6,386,577 B1 * | 5/2002 | Kan et al. ................. 280/730.2 |
| 6,450,528 B1 * | 9/2002 | Suezawa et al. ......... 280/730.2 |
| 6,588,838 B1 | 7/2003 | Dick, Jr. et al. |
| 2002/0063452 A1 | 5/2002 | Harada et al. |
| 2005/0156412 A1 | 7/2005 | Panagos et al. |
| 2006/0113772 A1 * | 6/2006 | Tracht ..................... 280/730.2 |
| 2006/0113773 A1 * | 6/2006 | Tracht ..................... 280/730.2 |

* cited by examiner

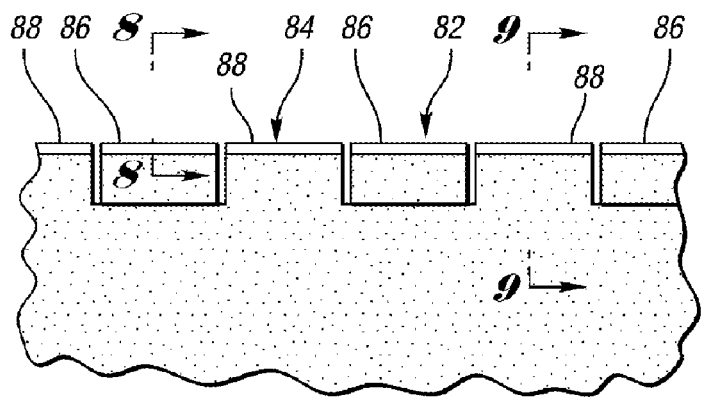
Fig. 7
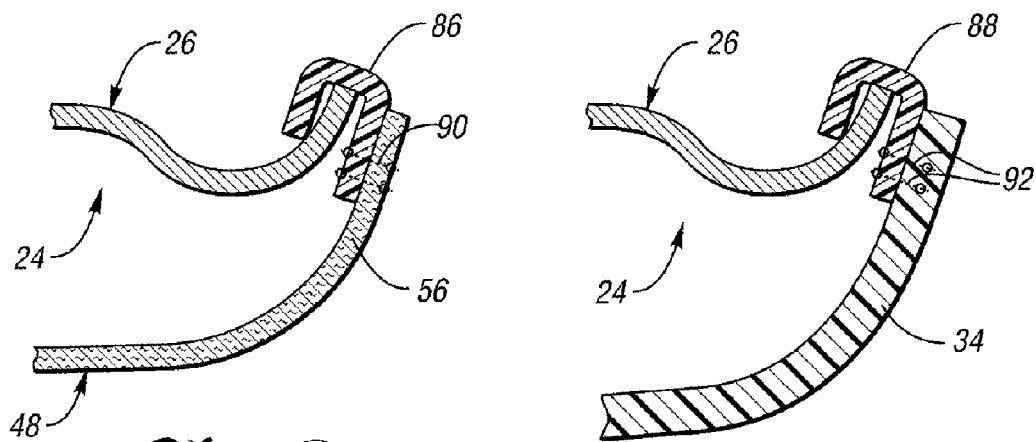
Fig. 8
Fig. 9
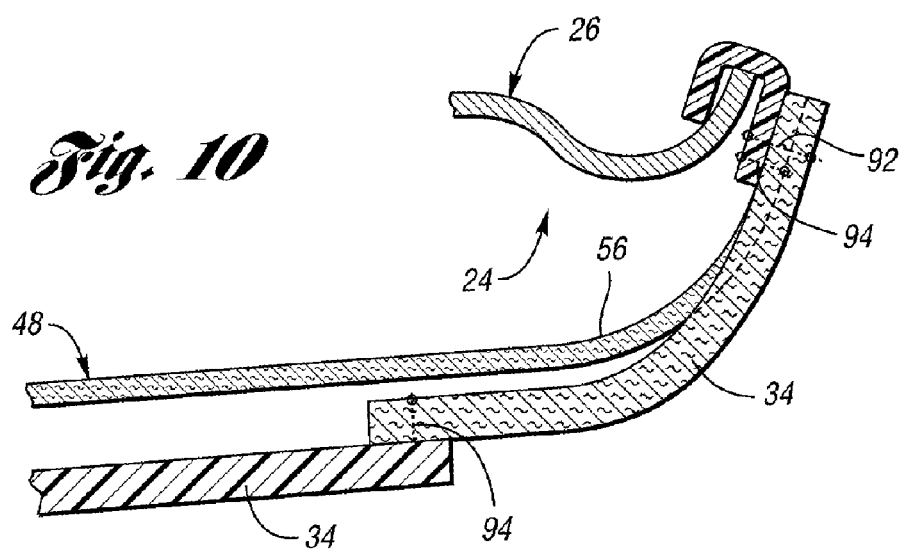
Fig. 10

VEHICLE SEAT COMPONENT SIDE AIR BAG MODULE HAVING AIR BAG GUIDE INCLUDING FLEXIBLE INNER AND OUTER PANELS ATTACHED BY MODULE CONNECTOR AND FRAME CONNECTOR AND TRIM COVER ATTACHED BY FRAME CONNECTOR

BACKGROUND OF THE INVENTION

1. Field of the Invention

This invention relates to a vehicle seat component side air bag module having an air bag guide with flexible inner and outer panels having inner extremities respectively secured by a module connector and a frame connector and having a trim cover secured by another frame connector.

2. Background Art

Vehicle seat components have previously included side air bag modules and conventionally include trim covers that have an air bag release seam through which an air bag upon deployment is projected outwardly from within the seat to provide occupant protection. See, for example, U.S. Pat. No. 5,816,610 Higashiura et al.; U.S. Pat. No. 5,860,673 Hasegawa et al.; and U.S. Pat. No. 5,938,232 Kalandek et al. Different constructions have been utilized to permit passage of the air bag past foam seat padding when inflated by an inflator for movement from within the seat component outwardly through the trim cover release seam. For example, U.S. Pat. No. 6,045,151 Wu discloses a seat pad having a slot through which the air bag moves from an air bag module to the release seam and also discloses a cloth sleeve that extends entirely about the associated air bag module and to the release seam. Also, U.S. Pat. No. 6,237,934 Harrell et al. and U.S. Pat. No. 6,588,838 Dick, Jr. et al., both of which are assigned to the assignee of the present invention, disclose air bag modules wherein the air bag module is located closely adjacent to the release seam to facilitate the air bag deployment.

SUMMARY OF THE INVENTION

An object of the present invention is to provide an improved vehicle seat side air bag module for providing seat occupant protection.

A vehicle seat component constructed in accordance with the invention includes a frame for mounting on an associated vehicle on which the vehicle seat component is to be used. A seat pad is mounted by the frame and having a side extremity, and a trim cover extends over the seat pad and has an air bag release seam adjacent the side extremity of the seat pad. An air bag module is mounted on the frame within the trim cover in a spaced relationship from its air bag release seam. The air bag module includes an inflator and an air bag that is inflated by the inflator and projected outwardly from the seat component through the air bag release seam of the trim cover. An air bag guide of the seat component includes an inner panel and an outer panel that are each made of flexible material and have outer and inner extremities with their outer extremities connected to the trim cover adjacent the air bag release seam. The flexible inner and outer panels extend alongside each other from their outer extremities to the air bag module and thence respectively inwardly and outwardly of the air bag module. A first connector secures the air bag module to a portion of the frame with the flexible inner panel extending along an inward side of the air bag module with its inner extremity secured by the first connector between the air bag module and the frame. The flexible outer panel extends alongside an outward side of the air bag module with a portion of the seat pad that extending outwardly thereof and inwardly of the trim panel. A second connector that secures the inner extremity of the flexible outer panel to the frame, and a third connector that secures the trim cover to the frame.

The flexible inner panel has its inner extremity extending from between the air bag module and the frame to provide a visual indication of the installation of the flexible inner panel.

In one embodiment, a retainer is secured to the inner extremity of the flexible inner panel and extends from between the air bag module and the frame to provide the visual indication of the installation of the flexible inner panel. The retainer of the inner extremity of flexible inner panel may include an enlarged bead.

In another embodiment the inner extremity of the flexible inner panel includes a folded back portion that extends from between the air bag module and the frame to provide the visual indication of the installation of the flexible inner panel. The folded back portion may include a stitched seam.

The second and third connectors include connection portions that alternate with each other in respectively attaching the inner extremity of the flexible outer panel and the trim cover to the frame. More specifically, the second and third connectors each have a plurality of hook shaped retainers, with the hook shaped retainers of the second connector secured to the inner extremity of the flexible outer panel at spaced locations from each other and attached to the frame at spaced locations, and with the hook shaped retainers of the third connector secured to the trim cover at spaced locations from each other and attached to the frame at spaced locations between the hook shaped retainers of the second connector.

It is also possible for the trim cover to include an extension portion that is secured by the third connector to the frame. In such case, the second and third connectors each have a plurality of hook shaped retainers, with the hook shaped retainers of the second connector secured to the inner extremity of the flexible outer panel at spaced locations from each other and attached to the frame at spaced locations, and with the hook shaped retainers of the third connector secured to the extension of the trim cover at spaced locations from each other and attached to the frame at spaced locations between the hook shaped retainers of the second connector.

The air bag release seam includes stitching through bent seam ends of the trim cover and through the outer extremities of the flexible inner and outer panels.

The vehicle seat component has particular utility as a seat back, especially with its one side extremity at an outboard location to provide protection from adjacent vehicle structure.

The objects, features and advantages of the present invention are readily apparent from the following detailed description of the preferred embodiment when taken in connection with the accompanying drawings.

BRIEF DESCRIPTION OF THE DRAWINGS

FIG. 7 is a partial view taken along the direction of line 7—7 in FIG. 3 to illustrate the manner in which connectors secure the inner extremity of the flexible outer panel of the air bag guide and the trim cover to the vehicle frame.

FIG. 8 is a sectional view taken along the direction of line 8—8 in FIG. 7 and illustrates the connector that secures the inner extremity of the flexible outer panel of the air bag guide to the frame.

FIG. 9 is a sectional view taken along the direction of line 9—9 in FIG. 7 to illustrate the manner in which the other connector secures the trim cover to the seat back component frame.

FIG. 10 is a view taken generally in the same direction as FIGS. 8 and 9 but showing the trim cover as having an extension to which the connectors are secured.

DETAILED DESCRIPTION OF THE PREFERRED EMBODIMENT

Figure 1:
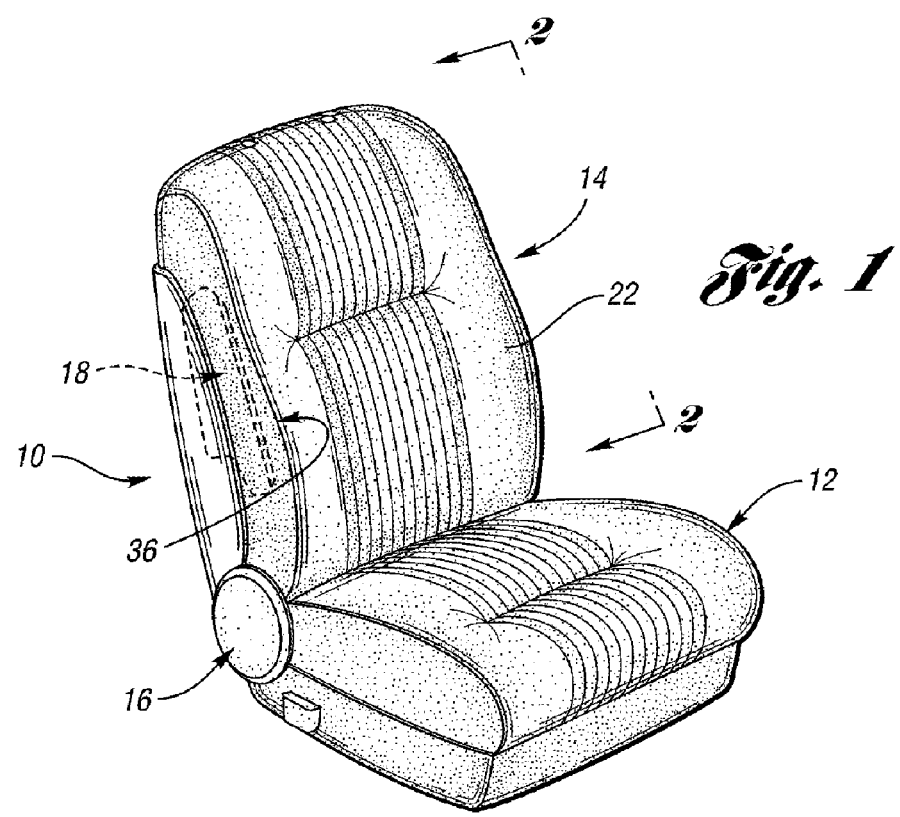
FIG. 1 is a perspective view of a vehicle seat including a seat back component constructed in accordance with the invention to include a side air bag module that is shown by hidden line illustration.
Figure 2:
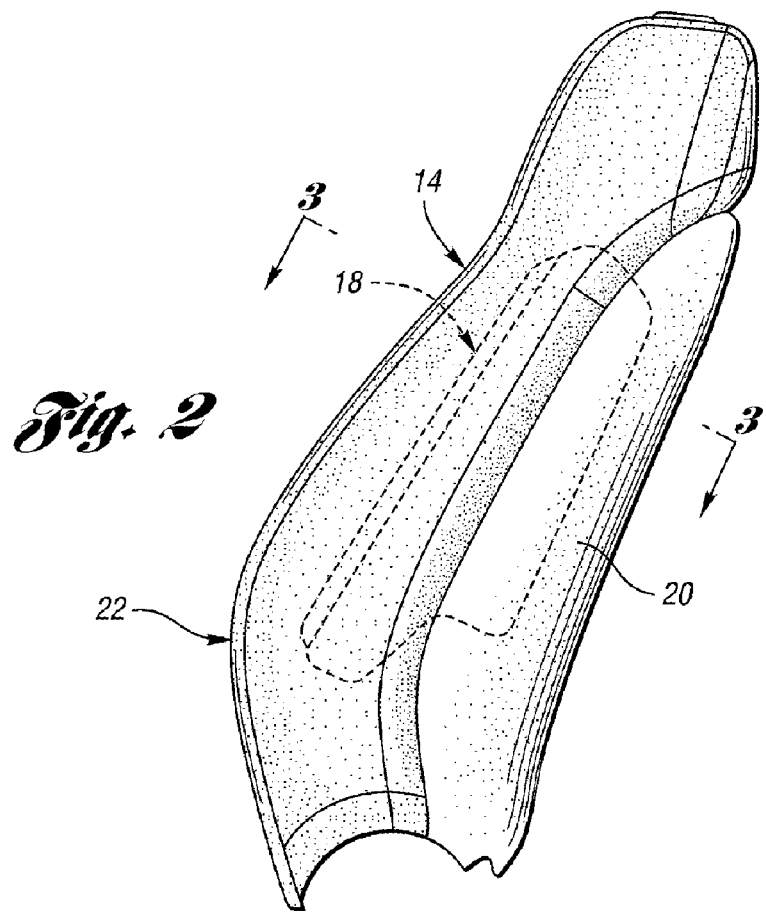
FIG. 2 is a side elevational view of the vehicle seat back component taken along the direction of line 2—2 in FIG. 1 with the side air bag module thereof also illustrated by hidden line representation.

With reference to FIG. 1 of the drawings, a vehicle seat generally indicated by 10 includes a seat bottom 12 for mounting on a vehicle floor and a seat back 14 mounted in a generally upstanding manner on the seat bottom with its angular position controlled in a conventional manner by a recliner generally indicated by 16. The seat back component 14 includes a side air bag module 18 that is constructed in accordance with the present invention as it is hereinafter more fully described and operable to provide seat occupant protection. While the side air bag module 18 is shown on the seat back 14, which is a usage for which it has particular utility, it is also possible for the side air bag module to be utilized with a seat bottom 12 even though the seat back usage is specifically disclosed. Also, as illustrated, the side air bag module 18 is located at an outboard lateral side or extremity of the seat to provide protection against adjacent vehicle structure, but it is also possible to have the side air bag module located at the inboard lateral side to provide protection against an adjacent vehicle occupant and to also have side air bag modules at both outboard and inboard locations for protection in both lateral directions. As shown in FIG. 2, the seat back 14 includes a back panel 20 that is conventionally molded from plastic and also includes a front cushion 22 against which the seat occupant leans to provide back support and in which the side air bag module 18 is located.

Figure 3:
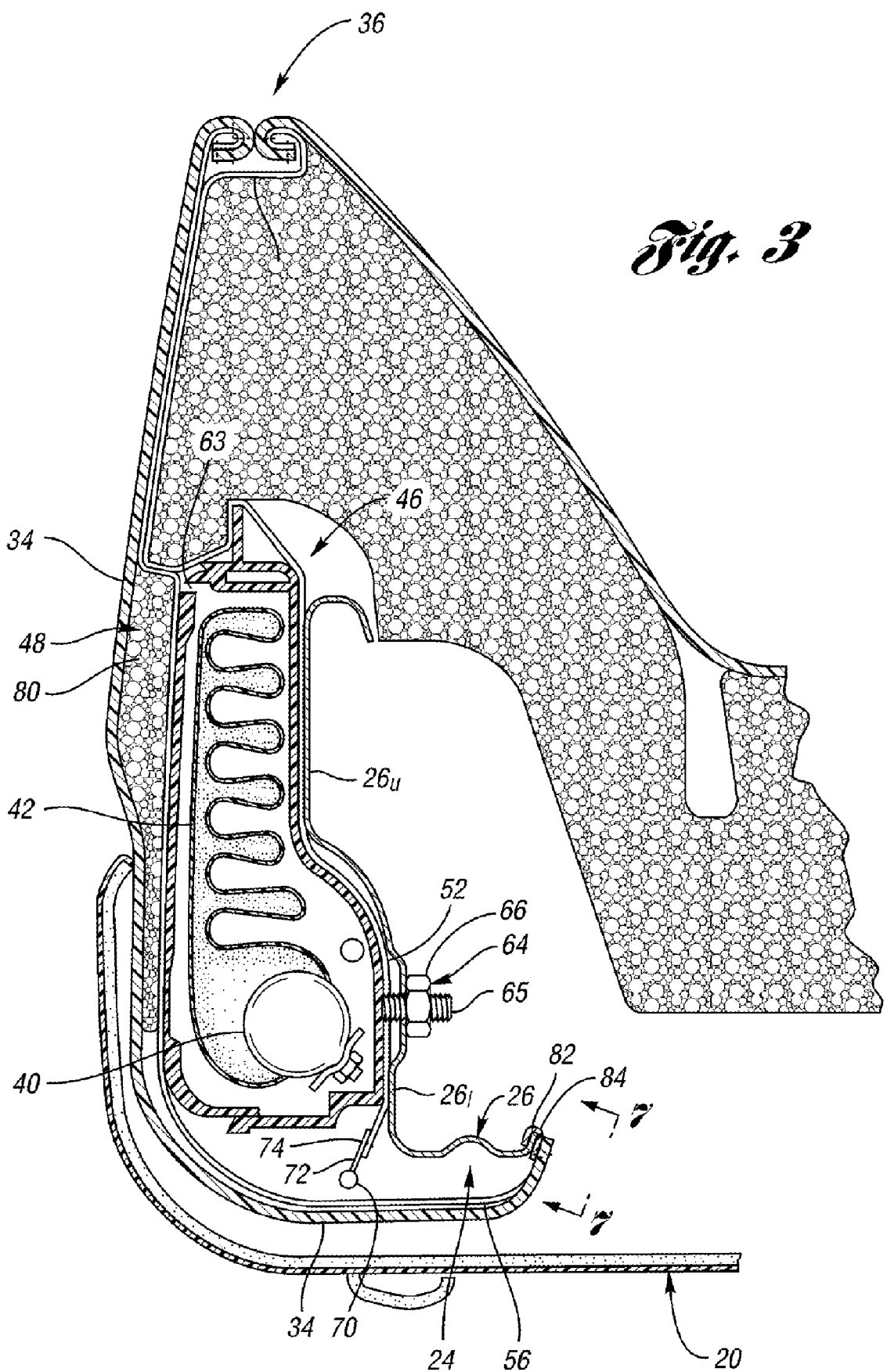
FIG. 3 is a sectional view taken through the seat back component along the direction of line 3—3 in FIG. 2 to further illustrate the construction of the side air bag module within the seat back component.

As shown in FIG. 3, the seat back component 14 includes a frame collectively identified by 24 and having a pair of frame members 26 at its opposite lateral sides as well as having frame tubes and other components all of which are identified by 28. A foam seat pad 30 is mounted on the frame 24 in any conventional manner and has opposite side extremities 32 spaced laterally from each other at the opposite lateral sides of the seat. A trim cover generally indicated by 34 extends over the seat pad 30 and includes an air bag release seam 36 adjacent the left side extremity 32 of the seat pad which, as previously mentioned, corresponds to an outboard location. The side air bag module 18 is located within the trim cover 34 mounted on the frame 24, specifically on the one side frame member 26 adjacent the air bag release seam 36 but in a spaced relationship from the release seam. The air bag module 18 includes an inflator 40 and a schematically illustrated folded or rolled air bag 42 which, upon deployment, is inflated by the inflator to project outwardly from the seat component through the air bag release seam 36 of the trim cover 34.

With continuing reference to FIG. 3, an air bag guide of the seat back component is generally indicated by 44 and includes an inner panel 46 and an outer panel 48 that are each made of a flexible material such as a suitable cloth. The flexible inner panel 46 has an outer extremity 50 adjacent the air bag release seam 36 and also has an inner extremity 52 as is hereinafter more fully described. The flexible outer panel 48 has an outer extremity 54 adjacent the air bag release seam 36 and has an inner extremity 56 which is hereinafter more fully described.

Figure 4:
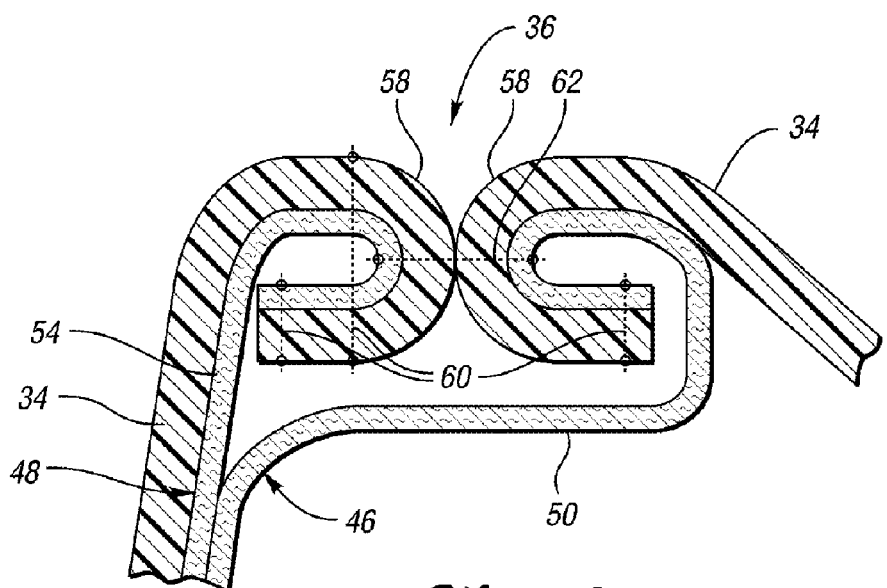
FIG. 4 is an enlarged view of a portion of FIG. 3 illustrating an air bag release seam of a trim cover of the seat back component.

As shown in FIG. 4, the air bag release seam 36 includes bent seam ends 58 of the trim cover 34 and the outer extremities 50 and 54 of the flexible inner and outer panels 46 and 48. Stitching 60 provides securement of the flexible panel outer extremities 50 and 54 to the trim cover 34 and stitching 62 provides securement of the bent ends 58 to each other.

From the air bag release seam 36 illustrated in FIG. 4, the flexible inner and outer panels 46 and 48 extend alongside each other as shown in FIG. 3 from their outer extremities 50 and 54 to the side air bag module 18 and thence inwardly and outwardly thereof for connection within the seat back component as is hereinafter more fully described. Upon deployment of the side air bag module 18, the air bag 42 moves through a module opening 63 and thence between the flexible inner and outer panels 46 and 48 which then provide a guiding function of the air bag 42 as it moves between the panels toward the air bag release seam 36 and eventually tears open the release seam for outward projection of the air bag to provide the occupant protection. The inner and outer flexible panels 46 and 48 may be made of any suitable flexible material effective to guide the air bag 42 from the module to the release seam. For example, a woven or non-woven cloth material, which may include natural materials or a synthetic material such as nylon. One material that is found to be effective is a polyester material of the type from which the air bag 42 may be manufactured. Regardless of the type of material used to make the air bag guide 44, the use of the air bag guide can be helpful in reducing friction on the air bag 42 as it is deployed. Although a polymer such as nylon may be particularly beneficial, even a fleece material will help reduce the friction on the air bag 42 because the air bag guide 44 prevents contact between the deploying air bag 42 and the seat pad 30.

As illustrated in FIG. 3, a first connector 64 secures the air bag module 18 to the frame member 26 of the seat component frame 24 and may be of a suitable type such as a threaded stud 65 and threaded nut 66 that provide the securement. The inner extremity 52 of the flexible inner panel 46 of the air bag guide 44 is located between the air bag module 18 and the frame member 26 to which the air bag module is secured by this first connector 64 so as to secure the flexible inner panel during the deployment of the air bag as it is inflated by the inflator and guided by the air bag guide previously described. The seat component frame member 26 includes lower and upper portions $26_l$ and $26_u$ that clamp the inner extremity 52 of the flexible inner panel 46 against the air bag module 18 and a suitable aperture therein has the threaded stud 65 extending therethrough to receive the threaded nut that secured the connection.

Figure 5:
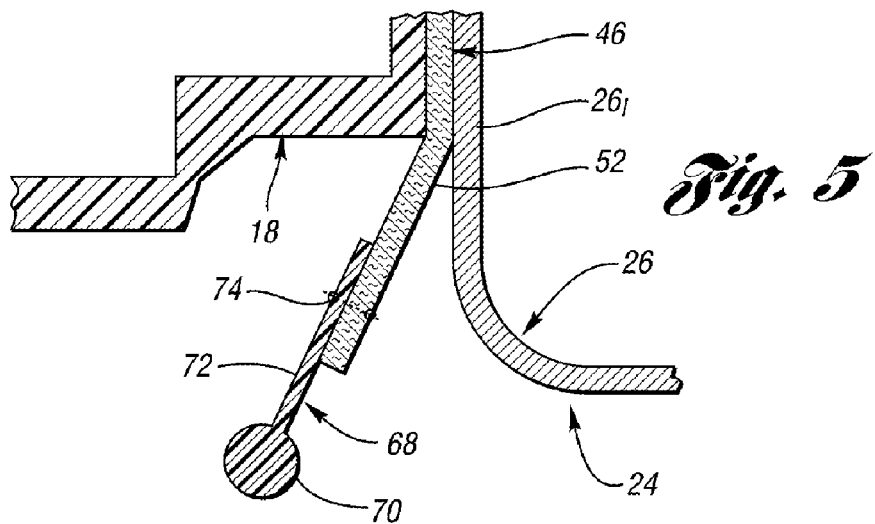
FIG. 5 is a view illustrating the manner in which the inner extremity of the flexible inner panel of the air bag guide extends from between the air bag module and has a retainer that provides a visual indication of the installation.

As shown in FIGS. 3 and 5, the inner extremity 52 of the flexible inner panel 46 extends from between the air bag module and the frame member 26 of frame 24 to provide a visual indication of the installation of the flexible inner panel and thereby apprises the seat component fabricators of the stage of assembly. In this embodiment, the flexible air bag inner extremity 52 includes a retainer 68 that includes an attachment bead 70 and a web 72 that extends therefrom and is secured by stitching 74 to the flexible inner panel.

Figure 6:
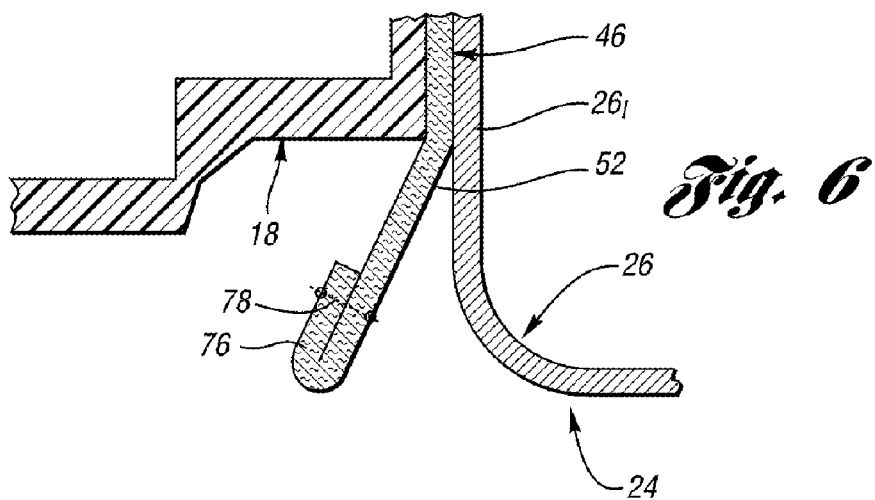
FIG. 6 is a view similar to FIG. 5 but showing another embodiment wherein the inner extremity of the flexible inner panel of the air bag guide includes a folded back portion that is stitched and provides the visual indication of the installation.

In another embodiment illustrated in FIG. 6, the inner extremity 52 of the flexible inner panel 46 includes a folded back portion 76 that extends from between the air bag module 18 and the frame member 26 of frame 24 to provide the visual indication of the installation of the flexible inner panel. This folded back portion 76 includes a stitched seam 78.

As shown in FIG. 3, the flexible outer panel 48 of the air bag guide 44 separates from the flexible inner panel 46 adjacent the upper extremity of the air bag module 18 and extends alongside the air bag module 18 in a downward direction inward from a portion 80 of the seat pad 30 that is located inward from the trim cover 34.

As shown in FIGS. 3 and 7-9, second and third connectors 82 and 84 respectively secure the inner extremity 56 of the flexible outer panel 48 and the trim cover 34 to the frame 24 at its frame member 26. The second and third connectors 82 and 84 includes connector portions 86 and 88 that are spaced from each other and arranged in an alternating relationship. Each of the connector portions 86 and 88 has a hook shape, with the outer flexible member connector portion 86 secured to its inner extremity 56 by stitching 90 and with the trim cover connector portion 88 secured by stitching 92.

The trim cover 34 may be made of cloth, vinyl or leather, etc. In some embodiments the trim cover 34 within the back panel 20 includes an extension 34' as shown in FIG. 10. This trim cover extension 34 is secured to the rest of the trim cover by stitching 94 and/or adhesive and can be made of any sufficiently strong and flexible material that can reduce the total cost of the trim cover without losing any aesthetic appeal since the back panel hides the trim cover extension.

Securement of the inner extremities 52 and 56 of the flexible inner and outer panels 46 and 48 as described above at spaced locations from each other distributes the loading applied by the air bag guide to the seat component during the air bag deployment.

Also, while the side air bag module 18 described above has particular utility for use with a vehicle seat back, especially at its outboard location, it is also possible for the side air bag to be utilized with other vehicle seat components such as with a seat bottom.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A vehicle seat component comprising:
a frame for mounting on an associated vehicle on which the vehicle seat component is to be used;
a seat pad mounted by the frame and having a side extremity;
a trim cover extending over the seat pad and having an air bag release seam adjacent the side extremity of the seat pad;
an air bag module mounted on the frame within the trim cover in a spaced relationship from its air bag release seam, and the air bag module including an inflator and an air bag that is inflated by the inflator to project outwardly from the seat component through the air bag release seam of the trim cover;
an air bag guide including an inner panel and an outer panel that are each made of flexible material and have outer and inner extremities with their outer extremities connected to the trim cover adjacent the air bag release seam, the flexible inner and outer panels extending alongside each other from their outer extremities to the air bag module and thence respectively inwardly and outwardly thereof;
a first connector that secures the air bag module to a portion of the frame with the flexible inner panel extending along an inward side of the air bag module with its inner extremity secured by the first connector between the air bag module and the frame;
the flexible outer panel extending alongside an outward side of the air bag module with a portion of the seat pad that extending outwardly thereof and inwardly of the trim panel;
a second connector that secures the inner extremity of the flexible outer panel to the frame; and
a third connector that secures the trim cover to the frame.

2. A vehicle seat component as in claim 1 wherein the flexible inner panel has its inner extremity extending from between the air bag module and the frame to provide a visual indication of the installation of the flexible inner panel.

3. A vehicle seat component as in claim 1 further including a retainer secured to the inner extremity of the flexible inner panel extending from between the air bag module and the frame to provide the visual indication of the installation and securement of the flexible inner panel.

4. A vehicle seat component as in claim 3 wherein the retainer of the inner extremity of flexible inner panel includes an enlarged bead.

5. A vehicle seat component as in claim 1 wherein the inner extremity of the flexible inner panel includes a folded back portion that extends from between the air bag module and the frame to provide the visual indication of the installation and securement of the flexible inner panel.

6. A vehicle seat component as in claim 4 wherein the folded back portion includes a stitched seam.

7. A vehicle seat component as in claim 1 wherein the second and third connectors include connection portions that alternate with each other in respectively attaching the inner extremity of the flexible outer panel and the trim cover to the frame.

8. A vehicle seat component as in claim 7 wherein the second and third connectors each have a plurality of hook shaped retainers, with the hook shaped retainers of the second connector secured to the inner extremity of the flexible outer panel at spaced locations from each other and attached to the frame at spaced locations, and with the hook shaped retainers of the third connector secured to the trim cover at spaced locations from each other and attached to the frame at spaced locations between the hook shaped retainers of the second connector.

9. A vehicle seat component as in claim 1 wherein the trim cover includes an extension portion that is secured by the third connector to the frame.

10. A vehicle seat component as in claim 9 wherein the second and third connectors each have a plurality of hook shaped retainers, with the hook shaped retainers of the second connector secured to the inner extremity of the flexible outer panel at space location s from each other and attached to the frame at spaced locations, and with the hook shaped retainers of the third connector secured to the extension of the trim cover at spaced location s from each other and attached to the frame at spaced locations between the hook shaped retainers of the second connector.

11. A vehicle seat component as in claim 1 wherein the air bag release seam includes stitching through bent seam ends of the trim cover and through the outer extremities of the flexible inner and outer panels.

12. A vehicle seat component as in claim 1 embodied as a seat back and wherein the one side extremity is at an outboard location.

13. A vehicle seat back comprising:
- a frame for mounting on an associated vehicle on which the vehicle seat back is to be used;
- a seat pad mounted by the frame and having a side extremity;
- a trim cover extending over the seat pad and having an air bag release seam adjacent the side extremity of the seat pad;
- an air bag module mounted on the frame within the trim cover in a spaced relationship from its air bag release seam, and the air bag module including an inflator and an air bag that is inflated by the inflator to project outwardly from the seat back through the air bag release seam of the trim cover;
- an air bag guide including an inner panel and an outer panel that are each made of flexible material and have outer and inner extremities with their outer extremities connected to the trim cover adjacent the air bag release seam, the flexible inner and outer panels extending alongside each other from their outer extremities to the air bag module and thence respectively inwardly and outwardly thereof;
- a first connector that secures the air bag module to a portion of the frame with the flexible inner panel extending along an inward side of the air bag module with its inner extremity secured by the first connector between the air bag module and the frame and extending outwardly therefrom to provide a visual indication of the installation of the flexible inner panel;
- the flexible outer panel extending alongside an outward side of the air bag module with a portion of the seat pad that extending outwardly thereof and inwardly of the trim panel;
- a second connector including a plurality of hook shaped retainers that are spaced from each other and cooperatively secure the inner extremity of the flexible outer panel to the frame; and
- a third connector including a plurality of hook shaped retainers that are spaced from each other and cooperatively secure the trim cover to the frame in an alternating relationship between the hook shaped retainers of the second connector that secure the inner extremity of the flexible outer panel.

* * * * *

UNITED STATES PATENT AND TRADEMARK OFFICE
CERTIFICATE OF CORRECTION

PATENT NO. : 7,195,274 B2
APPLICATION NO. : 10/904855
DATED : March 27, 2007
INVENTOR(S) : Michael L. Tracht It is certified that error appears in the above-identified patent and that said Letters Patent is hereby corrected as shown below:

Column 7, Line 11, Claim 10:

Delete "at space location s" and insert -- at spaced locations --.

Column 7, Line 14, Claim 10:

Delete "location s" and insert -- locations --.

Signed and Sealed this

Sixteenth Day of February, 2010

David J. Kappos
*Director of the United States Patent and Trademark Office*